(12) United States Patent
Yahkind et al.

(10) Patent No.: US 12,344,763 B2
(45) Date of Patent: Jul. 1, 2025

(54) HIGH TEMPERATURE CURABLE COATING COMPOSITION

(71) Applicant: AKZO NOBEL COATINGS INTERNATIONAL B.V., Amsterdam (NL)

(72) Inventors: Alexander Leo Yahkind, Nashville, TN (US); Jeffrey Charles Krotine, Jr., Nashville, TN (US); Theodore Canterbury, Nashville, TN (US)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/912,896

(22) PCT Filed: Mar. 30, 2021

(86) PCT No.: PCT/EP2021/058308
§ 371 (c)(1),
(2) Date: Sep. 20, 2022

(87) PCT Pub. No.: WO2021/198263
PCT Pub. Date: Oct. 7, 2021

(65) Prior Publication Data
US 2023/0193050 A1    Jun. 22, 2023

Related U.S. Application Data

(60) Provisional application No. 63/001,785, filed on Mar. 30, 2020.

(30) Foreign Application Priority Data

Jun. 10, 2020 (EP) .................................. 20179182

(51) Int. Cl.
C09D 7/20 (2018.01)
C09D 5/08 (2006.01)
C09D 7/61 (2018.01)
C09D 167/00 (2006.01)

(52) U.S. Cl.
CPC .............. C09D 5/084 (2013.01); C09D 7/20 (2018.01); C09D 7/61 (2018.01); C09D 167/00 (2013.01)

(58) Field of Classification Search
CPC . C09D 5/084; C09D 7/20; C09D 7/61; C09D 167/00
See application file for complete search history.

(56) References Cited

U.S. PATENT DOCUMENTS

| | | | |
|---|---|---|---|
| 4,352,899 A | 10/1982 | Tada et al. | |
| 5,688,598 A | 11/1997 | Keck et al. | |
| 5,868,819 A | 2/1999 | Guhde et al. | |
| 2003/0130468 A1 | 7/2003 | Konig et al. | |
| 2005/0181216 A1 | 8/2005 | Nakanishi et al. | |
| 2007/0048550 A1 | 3/2007 | Millero et al. | |
| 2009/0104363 A1 | 4/2009 | Abi-Karam et al. | |
| 2009/0324983 A1 | 12/2009 | Hackbarth et al. | |
| 2012/0025142 A1 | 2/2012 | Visser et al. | |
| 2014/0349121 A1 | 11/2014 | Tsujita et al. | |
| 2014/0378587 A1* | 12/2014 | Weiher ..................... | B05D 3/02 524/211 |
| 2015/0322271 A1 | 11/2015 | Labouche et al. | |
| 2017/0066927 A1 | 3/2017 | Breon et al. | |
| 2017/0107624 A1 | 4/2017 | Best et al. | |
| 2018/0162099 A1* | 6/2018 | Furar ..................... | C08L 75/04 |
| 2018/0182099 A1 | 6/2018 | Furar et al. | |

FOREIGN PATENT DOCUMENTS

| | | |
|---|---|---|
| EP | 0360422 | 3/1990 |
| WO | WO00/22054 A1 | 4/2000 |
| WO | 2010112605 | 10/2010 |
| WO | WO2016/012290 A1 | 1/2015 |
| WO | WO2016/196252 A1 | 12/2016 |
| WO | 2019126527 | 6/2019 |

OTHER PUBLICATIONS

English Translation of WO2015/012290A1.
European Search Report of Corresponding Application No. EP20179182.9, dated Sep. 17, 2020.
International Search Report and Written Opinion of Corresponding International Application No. PCT/EP2021/058308, mailed Jun. 17, 2021.
"Desmodur BL 3175 SN Product Data Sheet," Covestro, Jun. 1, 2017, 4 pages.
"Nacure & K-Cure Acid & Blocked Acid Catalysts," KING Industries Specialty Chemicals, 2020, 11 pages.
Notice of Opposition to European Patent Application No. 21714234.8 on behalf of PPG Industries, Inc, dated Oct. 31, 2024, 20 pages.
Time limited Google search showing the public availability of NACURE and K-Cure, Dec. 20, 2012.

(Continued)

*Primary Examiner* — Robert S Jones, Jr.
*Assistant Examiner* — Elizabeth Amato
(74) *Attorney, Agent, or Firm* — Pauly, DeVries Smith & Deffner LLC

(57) ABSTRACT

The invention relates to a high temperature curable coating composition comprising: (a) at least one film-forming resin, (b) at least one crosslinker for the film-forming resin, wherein the crosslinker is not substantially reactive at temperatures under 120° C., and (c) an anticorrosive agent, which comprises a combination of a magnesium compound and a water-soluble Li salt. The invention further provides a method of coating a metal substrate and a coated metal substrate. The resulting coating has excellent anticorrosive properties without the use of Cr(VI) compounds, while being suitable for high temperature cure conditions typical in coil coatings.

11 Claims, No Drawings

(56) References Cited

OTHER PUBLICATIONS

D. Wicks and Z. Wicks "Blocked isocyanates III: Part A. Mechanisms and chemistry," Progress in Organic Coatings, 1999, 36: 148-172.

Liu, Yanwen, et al. "Protective Film Formation on AA2024-T3 Aluminum Alloy by Leaching of Lithium Carbonate from an Organic Coating," Journal of the Electrochemical Society, 163(3) C45-C53 (2016), 10 pages.

Ranjbar, Z, et al., "Synthesis and characterization of diethylene glycol monobutyl ether-blocked diisocyanate crosslinkers," Progress in Organic Coatings, 2010, 69:426-431.

Rolph, Marianne S, et al., Blocked isocyanates: from analytical and experimental considerations to non-polyurethane applications, Polymer Chemistry, 2016 (7): 7351-7364.

Visser, Kosari, et al., "Cross-sectional characterization of the conversion layer formed on AA2024-T3 by a lithium-leaching coating," Applied Surface Science 512 (2020) 145665, 9 pages.

Visser, P, et al., "Lithium salts as leachable corrosion inhibitors and potential replacement for hexavalent chromium in organic coatings for the protection of aluminum alloys," J. Coat. Technol. Res., 2016, 13(4): 557-566.

Visser, Peter, et al., "Active corrosion protection of various aluminum alloys by lithium-leaching coatings," Surf. Interface. Anal., 2019, 51:1276-1287.

Wicks, Zeno Jr., "Blocked Isocyanates," Progress in Organic Coatings, 1975, 3:73-99.

"Nacure XC-300 Blocked Catalyst Product Data Sheet," King Industries, Dec. 26, 2017, 1 page.

\* cited by examiner

HIGH TEMPERATURE CURABLE COATING COMPOSITION

CROSS-REFERENCE TO RELATED APPLICATIONS

This application is a 35 U.S.C. § 371 national phase application of PCT Application No. PCT/EP2021/058308 (published as WO 2021/198263 A1), filed on Mar. 30, 2021, which claims the benefit of priority to U.S. Provisional Application No. 63/001,785, filed on Mar. 30, 2020 and EP Application Serial No. 20179182.9, filed on Jun. 10, 2020, each of which is incorporated herein by reference in its entirety.

FIELD OF THE INVENTION

The present invention relates to a high temperature curable coating composition. More specifically, the invention relates to a high temperature curable coating composition for coil coating use, capable of forming a coating with excellent anticorrosive properties.

BACKGROUND

Coil coatings are applied to continuous metal strips (coils) of metal to protect the uncoated metal before it is cut and formed. The metal surface is first cleaned from protective oil and thereafter coated with a coil coating primer. The primed, coiled metal can then be subjected to a wide variety of fabricating and post-forming operations wherein the coiled metal is cut to length, formed, or stamped to produce a metal object. Coil coating primers should be able to withstand the subsequent cutting, bending, stamping, drawing operations and accordingly, have sufficient flexibility and adhesion to the substrate. On the other hand, coil coating primers are also required to possess high chemical and corrosion resistance. Coil coatings are typically cured at high temperatures and short processing times (e.g. 20-60 sec to obtain a peak metal temperature (PMT) above 200° C.).

For anticorrosive properties Cr(VI) compounds have long been used, e.g. strontium chromate. However, Cr(VI) compounds are nowadays no longer preferred due to their toxicity and carcinogenic properties. Predominantly Cr-free anticorrosion pigments are now preferred for use in coil primers. There is however an ongoing need for new Cr-free coil primers with better anticorrosion resistance and other chemical and physical properties.

Therefore, there is a desire to provide anticorrosive coil coating compositions, especially, Cr-free coating compositions, which both lead to coatings with excellent corrosion resistance, and can be cured at typical coil coating conditions, i.e. high temperatures and short curing times.

SUMMARY OF THE INVENTION

In order to address the above-mentioned desires, the present invention provides, in a first aspect, a high temperature curable coating composition comprising:
  (a) at least one film-forming resin,
  (b) at least one crosslinker for the film-forming resin, wherein the crosslinker is substantially not reactive with the film-forming resin at temperatures under 120° C., and
  (c) an anticorrosive agent, which comprises a combination of a magnesium compound and a lithium salt, wherein the lithium salt is selected from inorganic and organic lithium salts that have a solubility constant in water of at least $1 \times 10^{-11}$ at 25° C.

In another aspect, the present invention provides a method of coating a metal substrate, comprising the steps of:
  1) applying the coating composition according to the invention to an optionally pretreated metal substrate, and
  2) curing the coating composition in an oven to obtain a peak metal temperature of at least 200° C.

In a further aspect, the invention also provides a metal substrate coated by the method according to the invention.

DETAILED DESCRIPTION OF THE INVENTION

The present invention provides a high temperature curable coating composition, which comprises:
  (a) at least one film-forming resin,
  (b) at least one crosslinker for the film-forming resin, wherein the crosslinker is substantially not reactive with the film-forming resin at temperatures under 120° C., and
  (c) an anticorrosive agent, which comprises a combination of a magnesium compound and a lithium salt, wherein the lithium salt is selected from inorganic and organic lithium salts that have a solubility constant in water of at least $1 \times 10^{-11}$ at 25° C.

"High temperature curable" means in the present case that the coating composition is only fully curable at an appreciable rate above 120° C., preferably above 130° C. "Full cure" means that nearly all available reactive groups of either the film-forming resin and/or the crosslinker have reacted. The coating composition according to the present disclosure can therefore not be fully cured at an appreciable rate below 120° C. In some embodiments, the coating composition of the present disclosure does not form a network below 120° C. at an appreciable rate. This means that there is no significant increase in cross-link density and/or viscosity for a prolonged time period, e.g. for at least 1 day, preferably at least 1 week, more preferably at least 1 month. In some embodiments, the coating composition does not substantially form a network below 120° C. at all, which means there is no measurable increase in the cross-link density and/or viscosity for the above-mentioned prolonged time period. The coating composition, containing both the film-forming resin and crosslinker, therefore has a long shelf-life, e.g. at least 1 month, more preferably at least 6 months, yet more preferably, at least 1 year.

High temperature curable coating compositions typically comprise a crosslinker, which is substantially not reactive with the film-forming resin at low temperatures. Such crosslinkers only become fully reactive at high temperatures. "Substantially not reactive" means that there is no significant increase in cross-link density and/or viscosity of the total composition for at least 1 week. Preferably, the crosslinker is not at all reactive at temperatures below 120° C., which means that there is no measurable increase in cross-link density and/or viscosity of the total composition for at least 1 week.

Film-Forming Resin (a)

The coating composition according to the present disclosure comprises at least one film-forming resin (a), which can be any film-forming resin suitable for high temperature curable compositions. Also, mixtures of film-forming resins can be used. Under the "film-forming resin" it is understood monomers, oligomers and polymers, which during curing of the coating form a polymeric system. Preferably, the at least one film-forming resin is selected from the list consisting of polyesters, polyacrylates, polyurethanes, and epoxy resins.

The film-forming resin preferably comprises functional groups, which are capable of reacting with the functional groups of the crosslinker. In some embodiments, it is preferred that the film-forming resin contains OH or NH functional groups, more preferably OH groups.

Examples of suitable film-forming resins include OH functional polyesters, OH functional polyacrylates, OH functional epoxy resins, or OH functional polyurethanes. Preferred film-forming resins are OH functional polyesters and OH functional epoxy resins. Polyesters can be prepared from OH functional compounds (e.g. diols, triols, OH-functional oligomers, polyols) and acids, anhydrides or their combinations, as known to the skilled person. The polyesters can be branched or linear, more preferably linear polyesters are used. Such resins are, for example, commercially available under names SETAL 16-1084, SETAL 1671, Setal 186 SS-65, Setal 16-1173 from Allnex.

The film-forming resin is preferably present in the coating composition in an amount of 10-90 wt. %, more preferably 15-80 wt. % based on the total non-volatile content of the coating composition.

Crosslinker (b)

The coating composition according to the invention further contains a crosslinker (b) for the at least one film-forming resin (a). The crosslinker contains functional groups reactive towards the functional groups of the at least one film-forming resin. The crosslinker present in the coating composition is a high temperature crosslinker. "High temperature crosslinker" means that the crosslinker is not fully reactive at temperatures under 120° C., more preferably under 130° C., yet more preferably under 150° C., and is only fully reactive at higher temperatures (with or without a catalyst).

It is further preferred that the coating composition is essentially free from low temperature crosslinkers, i.e. which are substantially reactive towards the film-forming resin at temperatures under 120° C., more preferably under 130° C., yet more preferably under 150° C. "Essentially free" means less than 1 wt. % present, more preferably less than 0.1 wt. % present. Most preferably, the coating composition does not contain any of such low temperature crosslinkers.

Preferably, the high temperature crosslinker is present in an amount 0.1-20 wt. %, preferably 1-15 wt. %, based on the total non-volatile content of the coating composition. The relatively low amount of crosslinker has an advantage that the resulting coating has good flexibility properties required in many coil coating applications.

In some embodiments, the crosslinker can be present in a stoichiometric amount with respect to the film-forming resin. In other embodiments, it can be preferred to have an excess of the crosslinker with respect to the film-forming resin. The necessary amounts of the crosslinker can easily be calculated by a skilled person based on the weight of the film-forming resin and the functionalities of the film-forming resin and the crosslinker.

Skilled person is aware of suitable crosslinkers for each type of film-forming resins. For example, if the film-forming resin contains hydroxyl functional groups, suitable crosslinkers with isocyanate, carboxyl, or partially/fully alkoxylated amino groups can be used. Since the reaction between the film-forming resin and the crosslinker only takes place at high temperatures (>120° C.), the crosslinker is not substantially reactive at lower temperatures. Such crosslinkers are for example amino resins or blocked polyisocyanates. Mixtures of crosslinkers can also be used.

With respect to amino resins, these for example include melamines, urea, glycolurils and benzoguanamine. Preferred compounds include melamine resins and more preferably partially or fully alkoxylated melamine resins such as hexamethoxymethylmelamine (HMMM). Commercially available melamine crosslinkers include, for example, Cymel range from Allnex, particularly, Cymel 300, Cymel 301, Cymel 303 LF, Cymel 304, Cymel 350, Cymel 370, Cymel 373, Cymel 380, Cymel 3745.

With respect to polyisocyanates, these can for example be aliphatic, aromatic or a mixture thereof. Polyisocyanates mean an isocyanate functionality of 2 or more. Isocyanate prepolymers can also be used. Examples of suitable polyisocyanates include trimers prepared from toluene diisocyanate, 4,4'-methylene-bis(cyclohexyl isocyanate), isophorone diisocyanate, 1,6-hexamethyl diisocyanate, and 4,4'-diphenylmethylene diisocyanates. Preferably blocked isocyanates are used, which are deblocked at high temperature (above 120° C. or higher). Examples of blocking agents include short chain aliphatic and cycloaliphatic alcohols, oximes (methyl ethyl ketone oxime (MEKO)), pyrazoles (3,5-dimethylpyrazole (DMP)), lactams (ε-caprolactam), and phenolic compounds. Blocked isocyanates are known to a skilled person. Examples include Vestagon B 1065, Vestagon B 1400, Vestagon B 1530 from Evonik, or Tolonate D2 from Vencorex.

The coating composition can also contain additional compounds, reactive with the film-forming resins and/or crosslinkers. For examples, silanes can be used, which can be aliphatic, aromatic, and include methoxylated, ethoxylated, propoxylated, and butoxylated silanes, or a mixture thereof. Preferably propoxylated and butoxylated silanes are used. Silanes may also have a secondary functionality such as epoxy, amino, ethenyl or methacryloxy. Preferably, epoxy silanes are used. Examples of suitable silanes include glycidoxymethyl tripropoxysilane, glycidoxyethyl tripropoxysilane, glycidoxypropyl tripropoxysilane, epoxycyclohexyl POSS®, 1,3-bis [2-(3,4 epoxycyclohexyl)ethyl]tetramethyldisiloxane and tetrakis [(epoxycyclohexyl)ethyl]tetramethylcyclotetrasiloxane.

The coating composition according to the present disclosure preferably contains a catalyst for the reaction between the crosslinker and the film-forming resin. The catalyst is preferably selected from metal compounds (particularly tin compounds), acidic compounds and others known to the skilled person. More preferably, the catalyst is an acidic compound, such as a carboxylic or sulfonic acid. Examples of acidic compounds include p-toluene sulfonic acid, dodecyl benzene sulfonic acid, dinonyl naphthalene disulfonic acid, alkyl phosphates, phosphoric acid, carboxylic acids, and pyrophosphates.

The presence of an acidic catalyst together with the anticorrosive agent, however, can lead to stability problems and decreased catalytic or anticorrosive activity of the coating. The problem is especially significant when both are used within a 1K (single pack) coating composition. Particularly, this is the case when acidic catalysts are used in combination with certain salts (e.g. carbonate, particularly lithium carbonate) or with basic compounds such as oxides and hydroxides (e.g. MgO, Mg hydroxide).

Therefore, in a particularly preferred embodiment, the catalyst is a blocked acidic catalyst, which only deblocks (becomes reactive) at temperatures higher than 120° C., preferably higher than 130° C., more preferably higher than 150° C. (at an appreciable rate). The catalyst can for example be blocked by an amine or a polymer. Examples of such catalysts are blocked sulfonic acids such as Nacure DNNDSA, Nacure XC-300, Nacure 5414 from King Industries, Cycat 4045, Cycat 6020 from Allnex.

Anticorrosive Agent (c)

The coating composition of the present disclosure further comprises an anticorrosive agent (c), which is preferably a mixture of compounds. The anticorrosive agent comprises a combination of a magnesium compound and an organic or inorganic lithium salt with a solubility constant in water of at least $1\times10^{-11}$ at 25° C. It is further preferred that the coating composition is free from Cr(VI) compounds.

The magnesium compound is preferably selected from magnesium oxide, magnesium hydroxide and magnesium salts, particularly basic salts e.g. magnesium carbonate, and their hydrates. Preferably, magnesium oxide is used. MgO is preferably present in an amount 0.1-50 wt. %, more preferably 5-40 wt. %, based on the non-volatile content in the coating composition.

The lithium salt according to the present invention is a water-soluble lithium salt. It can be an inorganic or organic lithium salt. Both the anion and the cation of the lithium salt should be soluble in water. Lithium (poly) silicates and lithium-exchanged (silica) particles are therefore not considered to be the suitable lithium salts. The lithium salt preferably has a solubility constant in water at a temperature of 25° C. ($K_{sp}$; 25° C.) of at least $1\times10^{-11}$, more preferably in the range $1\times10^{-11}$ to $5\times10^{-2}$, and most preferably $1\times10^{-5}$ to $2.5\times10^{-2}$. The solubility constant is a function of the equilibrium concentrations of the ions in a saturated aqueous solution of the respective lithium salt. The solubility constants for different salts can be found in the *Handbook of Chemistry and Physics*.

Examples of suitable lithium salts are lithium carbonate, lithium phosphate, lithium sulphate, lithium molybdate, and lithium tetraborate. Lithium phosphate is the preferred salt. The lithium salt is preferably present in an amount 0.1-5 wt. %, based on the non-volatile content of the coating composition, preferably 0.5-2.5 wt. %. In some embodiments, the lithium salt can be present in low amounts (below 1.5 wt. %), while still achieving good corrosion resistance.

The use of a lithium salt in combination with a magnesium compound in an anti-corrosive coating composition surprisingly improves corrosion resistance and reduced blistering along the scribe.

In addition to the above-described two anticorrosive compounds, other anticorrosive compounds can also be present. In some embodiments, it can be preferred that a Zn compound is present, such as zinc orthophosphate, zinc orthophosphate hydrate, zinc aluminium orthophosphate.

The coating composition according to the present disclosure can further comprise pigments (e.g. titanium dioxide or iron oxide yellow) and conventional additives such as extenders (e.g. talcum, barium sulphate, mica, calcium carbonate, silica, or wollastonite), rheology modifiers (e.g. Bentone SD 2 or organic rheology modifiers), flow and levelling agents (e.g. polysiloxanes and polyacrylate levelling additives), etc.

The coating composition according to the present disclosure can be waterborne or solventborne. In some embodiments it is preferably solventborne. Solventborne is defined as containing a total volatile liquid diluent content, including water and organic solvent, of at least 50 wt. % and preferably at least 95 wt. % of the total weight of volatile liquid diluent being organic solvent. Preferred solvents include ketones such as methyl isobutyl ketone, aromatics such as xylene, alcohols such as benzyl alcohol, esters such as butyl acetate, and aliphatic solvents e.g. butyl glycol. Waterborne is defined as having at least 50 wt. %, preferably at least 95 wt. % of the total weight of volatile liquid diluent being water. Small amounts of organic solvents can still be present, e.g. at most 5 wt. %.

The solids (non-volatile) content of the coating composition is preferably in the range 25-75 wt. %.

The coating composition is preferably provided in the form of 1K (single pack) coating composition. This means that all the components are present in one formulation, which is stable during storage. The invention further provides a method of coating a metal substrate, comprising the steps of 1) applying the coating composition according to the present invention to an optionally pretreated metal substrate, and
2) curing the coating composition in an oven to obtain a peak metal temperature (PMT) of at least 200° C.

PMT is the peak metal temperature, which is the temperature achieved by the metal substrate during the cure in the oven. A coated substrate is heated in a high temperature oven (oven temperature up to 400° C.) during a desired time (dwell time) until it has achieved a PMT in a desired range. This heating can, for example, take place in a heated oven, in particular in a continuous furnace, which generally must have a temperature significantly higher than the PMT. For example, the furnace temperature may be 400° C., and the PMT can be controlled in the furnace zone via the residence time of the coated substrate to be in the range 200-250° C. Preferably, the substrate is not held at a long period of time at the PMT but allowed to cool after reaching the PMT immediately. For this, active cooling measures such as cooling with water can be provided. The dwell times in the oven until reaching the PMT are typically under 1 minute in coil coating processes, preferably 20-60 sec, for example about 30 sec. In some embodiments, PMT is in the range 205-240° C., preferably 210-230° C.

The method according to the present disclosure is preferably a continuous coil coating method.

The present disclosure further provides a metal substrate coated by the method of the invention.

The coating composition according to the present disclosure can be used as an anti-corrosive primer to coat non-ferrous substrates, such as magnesium, magnesium alloys, titanium, aluminium, aluminium alloy, and lithium-aluminium alloy substrates. A preferred non-ferrous substrate is aluminium alloy. Examples of suitable aluminium alloys are 2024-T3 (bare or clad), 7075-T6 (bare or clad), 6061, 6111, 6022, 5052, 5083, 5251, 5454, 7017, and 7020.

The coating composition according to the present disclosure is also suitable to coat ferrous substrates, such as steel, zinc-galvanized steel, galvalume, and galfan. Examples of suitable ferrous substrates are cold and hot rolled steel, Stainless 304, B952 (zinc phosphate-modified), B1000 (iron phosphate-modified), and zinc-modified steel such as EZG 60G, EZG 60G with zinc phosphate modification, G90, and Galvanneal HIA Zn/Fe A45, EG and HDG.

The coating composition can be used as a single coat or as a part of a multi-layer coating system, e.g. as a primer, intermediate coat or a topcoat. Preferably, it is used in direct contact to (optionally pre-treated) metal. Consequently, it is preferably used as a primer or self-priming topcoat. The coating composition may be applied to the substrate, with and without the use of a hexavalent chromium-free pre-treatment with a sol-gel system such as AC-@131 (AC Tech), PreKote® (Pantheon Chemical), or a chemical conversion coating. It can also be applied to anodized surfaces, such as chromic acid anodized (CAA) surfaces, tartaric sulphuric acid anodized (TSA) surfaces, and boric sulphuric acid anodized (BSAA) surfaces.

In some embodiments, the coating composition is applied to a metal substrate to form a primer layer in a multilayer coating system comprising a primer layer and a topcoat. The topcoat may be a clear coat or a pigmented topcoat. Alternatively, the topcoat comprises a colour and/or effect imparting base coat applied on the primer layer and a clear coat applied on top of the base coat layer.

The coil coating obtained according to the present invention is Cr-free and offers improved corrosion resistance over coatings with conventional Cr-free corrosion inhibitors. Cr-free means free from compounds of Cr(VI). Improved corrosion resistance is achieved at low lithium salt contents (below 1.5 wt. %) and low dry film thicknesses of the primer (5-10 microns). The coating composition may be applied on one or both sides of the metal.

Another advantage of the present coating is that it is sufficiently flexible so that the coil primed metal can be made formable and weldable.

The coating composition is especially suitable for use in coil coatings and particularly used for the automotive industry. Other applications include buildings, exterior and interior metal panels, furniture and home appliance.

The invention will now be illustrated in the following, non-limiting examples. The amounts are given by weight percentages, unless otherwise stated.

Examples

Preparation of Coating Compositions

Coating compositions 2-6 with and without anticorrosive pigments were prepared according to Table 1. All amounts are given by weight percentages. Also, Coating composition 1, which is a commercial polyester-based coil primer from AkzoNobel, was used as a comparative example. Coating composition 1 contains conventional Cr-free anticorrosive pigments, which are not Mg, Li or Zn compounds. Coating compositions 3, 4 and 5 are also comparative—Coating composition 3 does not contain any corrosion inhibitors, while Coating compositions 4 and 5 contain only one corrosion inhibitor. Coating compositions 2 and 6 are according to the invention. Coating composition 2 further contains a Zn phosphate corrosion inhibitor.

TABLE 1

| Component\Coating | 2 | 3 | 4 | 5 | 6 |
|---|---|---|---|---|---|
| Polyester 1 | 22.05 | 29.97 | 22.15 | 22.12 | 22.12 |
| Polyester 2 | 14.67 | 19.88 | 14.73 | 14.73 | 14.73 |
| Cymel 303 LF | 3.35 | 4.54 | 3.28 | 3.28 | 3.28 |
| Dibutyltin dilaurate | 0.05 | 0.07 | 0.05 | 0.05 | 0.05 |
| Tolonate D2 | 2.84 | 3.85 | 2.74 | 2.74 | 2.74 |
| Nacure XC-300 | 0.55 | 0.74 | 0.56 | 0.56 | 0.56 |
| MgO | 21.49 | | | 21.65 | 21.65 |
| Li phosphate | 1.10 | | 1.09 | | 1.09 |
| Zn phosphate ZP 10 | 3.25 | | | | |
| Solvents* | 17.28 | 22.81 | 17.16 | 12.05 | 17.16 |
| Pigments** | 11.15 | 15.16 | 36.08 | 15.52 | 14.43 |
| Additives*** | 2.18 | 2.97 | 2.19 | 2.19 | 2.19 |

*mixture of Solvesso 100, xylene and butyl glycol; kaolin, titanium dioxide and barium sulfate; *conventional commercially available wetting, dispersing additives and adhesion promoters Polyester 1 (60% solids) and Polyester 2 (50% solids) are in-house linear, OH-functional polyesters prepared from conventional monomers. Polyester 1 has Mn ~3000, Tg 20° C. and OH value 30 mg KOH/g resin. Polyester 2 has Mn ~5000, Tg 60° C. and OH value 20 mg KOH/g resin.

Cymel 303 LF is a highly methylated melamine crosslinker from Allnex. Tolonate D2 is a blocked aliphatic polyisocyanate, 75% solids in aromatic solvent, from Vencorex. Nacure XC-300 is a covalently blocked catalyst based on an alkylaromatic sulfonic acid from King Industries.

Performance Tests

A primer having anti-corrosive pigments (ACPs) based on $Li_3PO_4$, $Zn_3(PO_4)_2 \times H_2O$, and MgO was prepared (Coating composition 2). Comparative formulations having the commercial chrome-free coil anti-corrosive pigments (Coating composition 1) and a formulation without added anti-corrosive pigments (Coating composition 3) were also tested. Two different substrates Al 6111 and Al 6022 were sanded (3M P320), cleaned with Sikkens M600 surface cleaner, surface treated (PTW) with Bonderite® AutoPrep™ Pretreatment Wipes, coated to 0.3 mils (7.5 µm) with the primer compositions using a drawdown method, and cured at 625° F. (329° C.) for 21 seconds to obtain a peak metal temperature of 420-435° F. (216-224° C.). The primed panels were then coated with a commercial 2K SB polyurethane topcoat Autocoat BT LV650 from AkzoNobel to 2 mils (50 µm) and subjected to corrosion testing. Each sample set contained 3 replicates and evaluated per ASTM D1654.

1) Adhesion Performance

Adhesion performance was tested 24 h after topcoat application. Adhesion was measured by Tape Test ASTM D3359-17. The results are shown in Table 2. Adhesion is rated on a scale from 0 to 5, where 0 means worst adhesion (removal of coating beyond the cross-cut, flaking and detachment) and 5 means excellent adhesion (no peeling or removal of coating, edges of cut completely smooth, no detachment).

TABLE 2

| Coating | Anti-corrosion agent | Adhesion (ASTM D3359-17) Method A (x-cut) | Adhesion (ASTM D3359-17) Method B (cross-cut) |
|---|---|---|---|
| 1 | Conventional ACP | 4A | 3B |
| 2 | MgO + Li salt | 5A | 5B |
| 3 | No ACP | 5A | 5B |

Adhesion performance on Al 6022 alloy was improved for Coating 2 when compared to the commercial coil primer (Coating 1) and similar to the commercial coil primer without anticorrosive pigments (Coating 3).

2) Cyclic Corrosion Test on Al 6111

Coating compositions of 1, 2 and 3 were applied to panels of aluminium alloy Al 6111 as a primer and overcoated with the above-mentioned topcoat. The coated panels were subjected to 2,000 hours cyclic corrosion testing in accordance with the cyclic corrosion test ASTM G85:A5. The results are given in Table 3.

TABLE 3

| Coating | Anti-corrosion agent | Creep from scribe (mm) | Scribe blisters ASTM D714 | Face blisters ASTM D714 |
|---|---|---|---|---|
| 1 | Conventional ACP | 22 | Dense | None |
| 2 | MgO + Li salt | 9 | Few | None |
| 3 | No ACP | 17 | Dense | None |

3) Cyclic Corrosion Test on Al 6022

Coating compositions of 1, 2 and 3 were applied to panels of aluminium alloy Al 6022 as a primer and overcoated with the above-mentioned topcoat. The coated panels were subjected to 2,000 hours cyclic corrosion testing in accordance with the cyclic corrosion test ASTM G85: A5. The results are given in Table 4.

TABLE 4

| Coating | Anti-corrosion agent | Creep from scribe (mm) | Scribe blisters ASTM D714 | Face blisters ASTM D714 |
|---|---|---|---|---|
| 1 | Conventional ACP | 5.3 | Few | None |
| 2 | MgO + Li salt | 4.7 | Few | None |
| 3 | No ACP | 10.3 | Dense | None |

4) Cyclic Corrosion Test on Al 6111—Primer Only

Coating compositions of 1 and 2 were applied to panels of aluminium alloy Al 6111 without applied topcoat. The coated panels were subjected to 2,000 hours cyclic corrosion testing in accordance with the cyclic corrosion test ASTM G85: A5. The results are given in Table 5.

TABLE 5

| Coating | Anti-corrosion agent | Creep from scribe (mm) | Scribe blisters ASTM D714 | Face blisters ASTM D714 | Scribe Appearance |
|---|---|---|---|---|---|
| 1 | Conventional ACP | 3.2 | Dense | Medium | Dull |
| 2 | MgO + Li salt | 3.1 | Few | Medium | Shiny |

5) Cyclic Corrosion Test on Al 6111—Primer Only

Coating compositions 4, 5 and 6 were applied to panels of aluminium alloy Al 6111 without applied topcoat. The coated panels were subjected to 1,000 hours cyclic corrosion testing in accordance with the cyclic corrosion test ASTM G85: A5. The results are given in Table 6.

TABLE 6

| Coating | Anti-corrosion agent | Creep from scribe (mm) | Scribe blisters ASTM D714 | Face blisters ASTM D714 | Scribe Appearance |
|---|---|---|---|---|---|
| 4 | Li salt | 4.4 | Dense | Few | Dull |
| 5 | MgO | 4.1 | Dense | Few | Dull |
| 6 | MgO + Li salt | 1.5 | Few | Few | Shiny |

Conclusions:

The corrosion resistance (2,000 h Prohesion, ASTM G85.A5) of the Al 6111 samples coated with the Li salt coil primer (Coating 2) is improved when compared to the commercial chrome-free coil primer (Coating 1) and the coil primer without ACPs (Coating 3).

The corrosion resistance of the Al 6022 panels coated with the Li salt coil primer (Coating 2) displayed slight corrosion along the scribe, which is similar to the commercial coil primer coating 1 and improved compared to the dense corrosion observed for the primer without added ACPs (Coating 3).

Primed panels in the presence and absence of ACPs were tested per ASTM G85.A5 without an applied topcoat (primer only) for 2,000 h. The observations indicate a clear improvement in corrosion resistance for the inventive primer (Coating 2) compared to the formulation without ACPs (Coating 3), despite the low film build ($\approx 0.3$ mils (7.5 μm)).

Primed panels having either MgO, LisPO$_4$, or MgO and Li$_3$PO$_4$ combined were tested per ASTM G85.A5 without an applied topcoat (primer only) for 1,000 h. Formulations having only MgO or Li$_3$PO$_4$ displayed extensive corrosion and a dull scribe appearance, while the inventive primer displayed a shiny scribe appearance and decreased creep from the scribe area. The observations indicate a clear and significant improvement in corrosion resistance for the primer having both MgO and Li$_3$PO$_4$, despite the low film build ($\approx 0.3$ mils (7.5 μm)).

The invention claimed is:

1. A high temperature curable coating composition comprising:
   (a) at least one film-forming resin;
   (b) at least one crosslinker for the film-forming resin, wherein the crosslinker is substantially not reactive with the film-forming resin at temperatures under 130° C.; and
   (c) an anticorrosive agent which comprises a combination of a magnesium compound and a lithium salt, wherein the lithium salt is selected from inorganic and organic lithium salts that have a solubility constant in water of at least $1 \times 10^{-11}$ at 25° C;

and further comprising a catalyst for the reaction between the crosslinker and the film-forming resin wherein the catalyst is a blocked acidic catalyst which only becomes reactive at temperatures higher than 130° C., and
   wherein the composition is provided in the form of a 1K (single pack) coating composition.

2. The composition according to claim 1, wherein the lithium salt is lithium phosphate.

3. The composition according to claim 1, wherein the magnesium compound is selected from magnesium oxide, magnesium hydroxide and magnesium salts.

4. The composition according to claim 1, wherein the anticorrosive agent further comprises a Zn compound.

5. The composition according to claim 1, wherein the at least one film-forming resin is selected from polyesters, polyacrylates, polyurethanes and epoxy resins.

6. The composition according to claim 1, wherein the crosslinker comprises a partially or fully alkoxylated melamine resin, a blocked polyisocyanate, or a combination thereof.

7. The composition according to claim 1, wherein the composition is solventborne.

8. A method of coating a metal substrate, comprising the steps of:
   applying the coating composition according to claim 1 to an optionally pretreated metal substrate, and
   curing the coating composition in an oven to obtain a peak metal temperature of at least 200° C.

9. The method according to claim 8, wherein said method is a continuous coil coating method.

10. A metal substrate coated by the method of claim 8.

11. The composition according to claim 1, wherein the catalyst is selected from p-toluene sulfonic acid, dodecyl benzene sulfonic acid, dinonyl naphthalene disulfonic acid, alkyl phosphates, phosphoric acid, carboxylic acids and pyrophosphates.

* * * * *